INVENTORS
D. E. POWELL &
B. W. SPEAR
BY
E. J. HOLLER &
W. A. SCHAICH
ATTORNEYS

INVENTORS
D. E. POWELL &
B. W. SPEAR
E. J. HOLLER &
W. A. SCHAICH
BY
ATTORNEYS

Nov. 30, 1965 D. E. POWELL ETAL 3,220,592
CATHODE-RAY AND OTHER VACUUMIZED TUBES RESISTANT
TO VIOLENT DEVACUATION
Filed March 19, 1962 4 Sheets-Sheet 4

INVENTORS,
D. E. POWELL &
BY B. W. SPEAR

E. J. HOLLER &
W. A. SCHAICH
ATTORNEYS

United States Patent Office 3,220,592
Patented Nov. 30, 1965

3,220,592
CATHODE-RAY AND OTHER VACUUMIZED TUBES RESISTANT TO VIOLENT DEVACUATION
Daryl E. Powell, Maumee, and Burton W. Spear, Toledo, Ohio, assignors, by mesne assignments, to Owens-Illinois Glass Company, Toledo, Ohio, a corporation of Ohio
Filed Mar. 19, 1962, Ser. No. 180,490
23 Claims. (Cl. 220—2.1)

The present invention primarily relates to television and more particularly to the control and prevention of fracture and implosive-explosive effects in sealed and vacuumized cathode-ray picture tubes for television reception. The invention more specifically relates to improved types of direct-viewing cathode-ray picture tubes as well as other vacuumized tubes having glass envelopes and methods of fabricating such tubes to eliminate breakage and to control devacuation thereof either in processing, shipping, installation, or while in service.

In the manufacture of television picture tubes having essentially all-glass envelopes, each tube is evacuated to a high degree of vacuum with the resultant effect of creating high external pressures over extensive surface areas of the tube. Relative dimensions of these tubes are such that substantial surface pressures are exerted on the glass sidewalls and particularly on viewing and sealed portions. In a vacuumized 27 diagonal inch rectangular picture tube the viewing area alone presents a surface area of about 400 sq. in. so that atmospheric loading places a total pressure of approximately 5800 pounds on the tube viewing portion. Such pressures cause a vacuumized tube to be highly subject to implosive-explosive effects upon fracture or breakage of the glass envelope and sudden uncontrolled devacuation thereof. Therefore, the tube envelope and its various sealed areas must be designed to safely withstand such high pressures without breaking during processing, shipment and installation, as well as during long-term service.

Television picture tube envelopes are subjected to variation in internal-external pressure conditions during initial fabrication of the tube and during reprocessing of certain tubes found to contain malfunctions. Varying the pressure differential during evacuation, devacuation and re-evacuation, for example, introduces excessive stresses into the tube envelopes, particularly at their areas of maximum cross-sectional dimensions as well as in the primary seal area, such as where hollow funnel and face plate members are circumferentially joined either by direct fusion or by an annular band of low-melting sealing composition. Tensive stresses can and do occur in exterior surface portions of the envelope at or adjacent the seal line. Such stresses present localized areas subject to damage such as by scratches or abrasion.

Heretofore, in the installation of television picture tubes in various types of receivers, a transparent implosion plate usually consisting of a tempered glass panel is mounted adjacent and fully coextensive with the tube viewing portion. Alternately, a contoured implosion plate is bonded to the tube viewing area as an integral component part of the tube to resist implosion-explosion effects. However, in both types of tube construction and mounting, whether the tube be unlaminated with a separable protection panel or laminated with an implosion plate integrally mounted thereon, the tubes may still be subject to destructive implosion either spontaneously or by thermal or physical shock.

In such implosions the glass of the envelope funnel sidewalls may break violently in such manner as to destroy component parts of the receiver by fragments being projected forcefully in random directions. The implosion panel serves to restrain glass fragmentation in a forward direction as well as to absorb front impacts delivered to the tube viewing portion. However, in all cases either the separate or integral implosion plate adds substantially to the cost of the tube per se or its mounting in a receiver cabinet. Further, the implosion plate having substantial dimensions and wall thickness adds to the overall weight and dimensions of the receiver, and in combination with the tube face plate, must provide proper light-transmitting characteristics while protecting viewing areas of the tube against implosion.

Obviously, in conventional types of essentially all-glass cathode-ray picture tubes for television reception, only the viewing area has been previously protected against implosion when the tube is properly installed. The body portion of the tube remains subject to damage either in processing, installation or when the receiver is serviced. The front implosion panel does not serve in any way to minimize or prevent damage to the tube body portion but merely deleterious effects in a forward direction. The implosion panel must have light-transmitting properties of near-optical clarity and no visual defects can be tolerated in either this member or the tube face plate. Near-optical perfection and strength requirements in these several members necessitate special precautions in their fabrication and handling. The present invention obviates the need for the conventional twin-panel system and matching of these component parts.

Accordingly, it is an object of the present invention to provide a direct-viewing cathode-ray television picture tube which is resistant both to fracture and sudden devacuation without serious fragmentation under widely varying adverse conditions.

Another object of this invention is to provide an improved type of glass vacuum tube envelope having characteristics of resistance to fracture and control over sudden devacuation wherever or however caused, the completed tube being fully capable of functioning in its normal manner.

Another object of this invention is to provide a novel non-imploding cathode-ray image tube which may be viewed directly without an implosion panel being mounted adjacent and coextensive with its viewing area, said tube having a protective covering over its major non-viewing exterior surfaces to resist common forms of glass surface damage and to eliminate violent devacuation.

Another object of this invention is to provide resistance to fracture and breakage in an evacuated hollow glass article having integral means to control its rapid evacuation upon accidental or spontaneous breakage.

Another object of this invention is to provide an improved type of cathode-ray picture tube envelope adapted to direct-viewing without the requirement of a supplemental implosion plate being mounted contiguous with its viewing portion, the non-viewing external surface areas of the tube having implosion and fracture preventing means disposed over such extensive exterior surfaces for their protection.

A further object of this invention is to provide a method of fabricating an electron-discharge tube envelope to mechanically control and restrain the major sidewalls thereof against uncontrolled fracture caused by accidental devacuation.

A still further object of this invention is to provide a method of imparting fracture restraint and eliminating implosive-explosive effects on breakage and sudden devacuation of a hollow glass vacuum tube envelope having substantial dimensions whereby upon breakage the envelope is permitted to controllably devacuate without deleterious fragmentation of its sidewalls.

The specific nature of this invention, as well as other objects and advantages will become apparent to those skilled in the art from the following detailed description taken in conjunction with the annexed sheets of drawings on which, by way of preferred example only, are illustrated the preferred embodiments of the invention.

On the accompanying drawings:

FIG. 3 is an exploded view illustrating the individual components utilized to form the tube shown in FIG. 1;

The present invention is described hereinbelow as specifically applied to the manufacture of a television cathode-ray image tube, however, it will be apparent to those skilled in the art that the invention is equally applicable to the manufacture of many different types of evacuated glass envelopes, particularly those having substantial dimensions which are subject to implosion and concomitant explosion on sudden devacuation.

The term "devacuation" as used herein is intended to mean the converse of vacuation as in the case where a vacuumized vessel experiences an internal pressure change toward atmospheric pressure upon loss of vacuum. The rate of change may occur rapidly or over a prolonged period of time.

The prior art has disclosed various tube constructions for minimizing implosion-explosion effects, one such construction being shown in U.S. Patent No. 2,785,820 to Vincent and Logue, issued March 19, 1957, entitled "Controlling Implosions in Cathode-Ray and Other Tubes." This patent is assigned to the same parent assignee as the present application. The referenced patent discloses the theory of providing fracture-resistance in the form of a tension band applied to the exterior of the tube envelope, the band applying compressive stresses to the exterior surface portions of the tube sidewalls adjacent and beneath the band. Picture tubes fabricated in accordance with the Vincent et al. invention are capable of resisting implosion to some degree; however, such tubes are not intended to be direct-viewing or utilized without an implosion plate or panel. Such tubes are fully capable of minimizing implosion-explosion effects caused by certain types of external forces such as those of lesser severity, however, their invention does not provide the same degree of fracture resistance to major non-viewing surfaces of the tube nor prevention of implosion effects caused by virtually all common forms of breakage regardless of character such as achievable by the present invention.

The present invention provides an implosion resistant system which is capable of being incorporated into existing types and shapes of conventional cathode-ray picture tubes without serious alteration or modification of present tube fabricating procedures. The invention may be incorporated in any selected type of tube using materials and methods which are capable of supplementing normal tube production.

The invention preferably involves the application of a contoured annular band which is firmly affixed to the periphery of the tube face plate surrounding its flange or skirt portion. A high-tensile strength material such as glass fiber cloth is adhered to major external surfaces of the tube funnel member extending substantially between its larger and smaller ends in a virtually continuous annular pattern. A second annular band is placed around the tube envelope surrounding and encompassing adjacent peripheral areas of the first-applied contoured band and the high-tensile strength material employed to cover the funnel. A single band having proper physical characteristics and configuration can also be employed to perform the functions of the several individual bands as desired or required.

In a preferred embodiment of the present invention a glass cathode-ray picture tube envelope 10 is normally comprised of a funnel member 11, face plate member 12, and neck tubulation 13 which are joined to form a unitary hollow glass article. The terminating end of neck 13 is normally sealed by one or more electron-beam emitting guns 14. Funnel member 11 is usually frusto-conical or frusto-pyramidal in shape with its small end 11a sealed to neck 13 and its large end 11b sealed to face plate 12. Electromagnetic beam deflecting coils (not shown) are normally mounted at the yoke area where neck 13 and funnel small end 11a are joined to provide proper scanning of the tube screen.

Face plate 12 consists of a concave-convex viewing portion bounded by a depending annular side panel or flange 12b. Face plate flange 12b and large end 11b of the funnel member terminate in annular sealing surfaces of complemental contour. The sealing surfaces are joined at a seal line 15 either by direct fusion of the glass or by an interposed annular layer of low-melting glass sealing composition which is selected as being compatible with the thermal and physical characteristics of the parent glass parts. The basic shape of the envelope viewing area may be either circular or rectangular in cross-section as conventionally known in the art with the sealing surfaces being substantially planar for forming a durable hermetic joint.

The invention as presently contemplated consists of applying selected elements to external non-viewing surfaces of the tube envelope either after the tube is fully fabricated or prior to subjecting the envelope to a tube fabricating process. In the former case the tube is fully completed and assembled with all its required external and internal working components properly installed in operative alignment and after its being subjected to bake-out temperatures and evacuation. In the latter case, the tube envelope consists of a so-called glass bulb having none of the electronic working components installed. The envelope or bulb is subjected to the application of the required elements with ambient conditions existing both internally and externally thereof. The bulb, after being fabricated into a form where its devacuation is controlled, is then subjected to a tube fabricating process. However, in the latter case the components of the present implosion-resistant system must be capable of withstanding required bake-out cycling temperatures and pressures of the tube making process.

Figure 1:
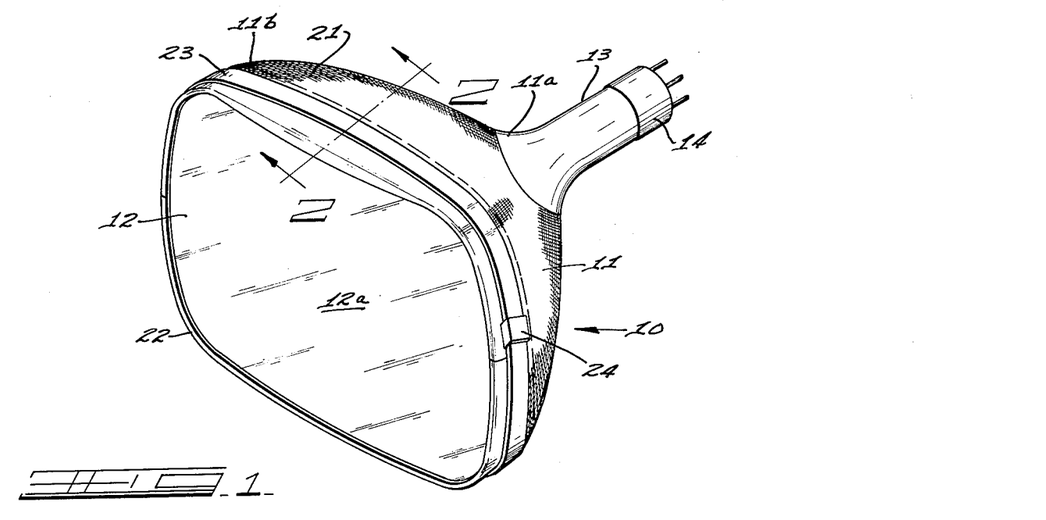
FIG. 1 is a perspective view of a cathode-ray television picture tube fabricated in accordance with the present invention.
Figure 2:
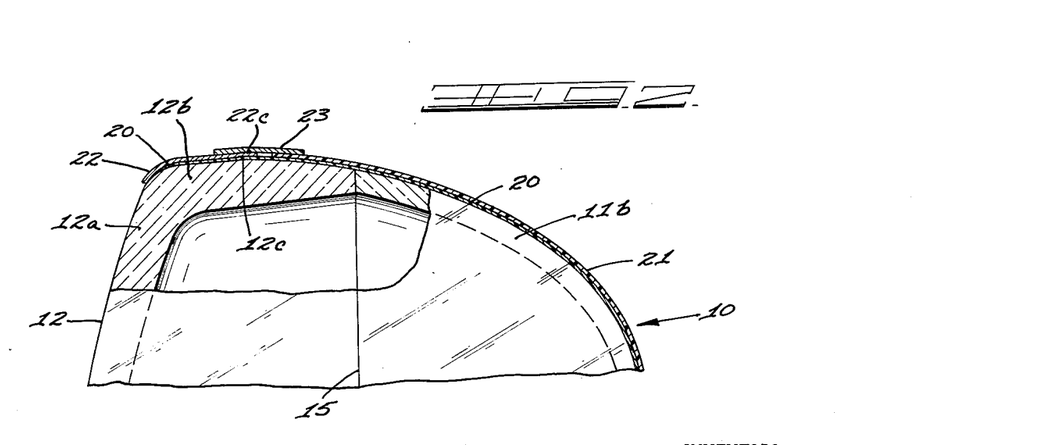
FIG. 2 is an enlarged vertical sectional view of one portion of the tube envelope taken along the line 2—2 of FIG. 1.
Figure 4:
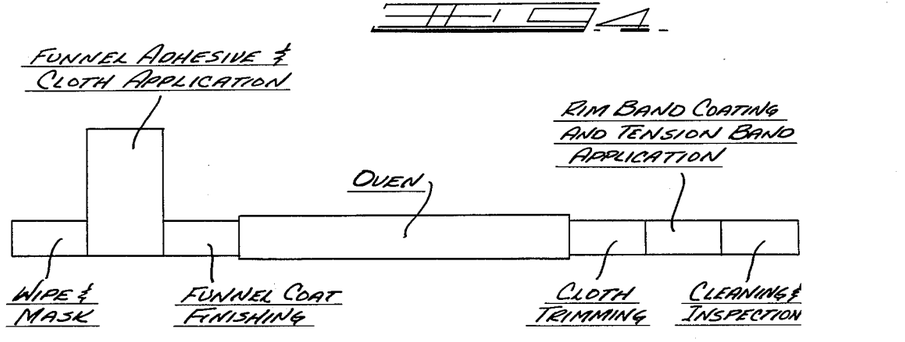
FIG. 4 is a schematic drawing of one method of fabricating the tube illustrated in FIGS. 1, 2 and 3 of the present invention.

A completed picture tube 10 capable of recreating transmitted images is taken for further fabrication and reinforcement of the tube envelope in accordance with the following method. One method of processing the tube is schematically outlined in FIG. 4 of the drawings and FIGS. 1, 2 and 3 illustrate the various components which are utilized to reinforce the envelope and control its accidental devacuation.

The tube 10 is placed on a suitable conveyor with the face plate 12 facing downwardly, the tube axis being vertically disposed. The external surfaces of the envelope funnel 11 and face plate skirt portion 12b are wiped clean or treated with a suitable solvent to ensure their cleanliness. A mask (not shown) is mounted around the viewing area 12a of the tube face plate to prevent bonding materials from being accidentally applied to the optical area.

A peripheral band of masking tape is effectively applied to surround the viewing area or, alternatively, a reusable mask is utilized to surround the periphery of the optical area. After masking the periphery of viewing area 12a the tube moves into a spray chamber.

In the spray chamber the tube is placed on a turntable or rotary jig. A cinch plug with a rubber cap or shield is snapped into the exteriorly-facing anode button 16 which is normally mounted within an intermediate area of the funnel sidewall. The yoke portion of the tube envelope at the small end 11a of the funnel member is also masked such as by a paperboard cylinder positioned over the tube neck with its lower end in contact with the glass surfaces. The tube is rotated and sprayed or brush coated with a continuous coating 20 of resinous material such as epoxy or polyester resin. A preferred material consists of Dow Epoxy Resin No. 741 manufactured by Dow Chemical Company which has been previously heated to a temperature ranging from 170° to 190° F., the resin having been previously mixed with eight parts of Dow Epoxy Resin Hardener No. 61 per one hundred parts of resin. The epoxy resin consists of a thermosetting synthetic resin having the ability to chemically bond to the glass surfaces with the coating having greater flexibility than the phenolics with good chemical resistance. Dow Epoxy Resin (D.E.R.) No. 741-A is a clear resin system developed for laminating glass implosion panels to glass cathode-ray tube faces and is described in Dow Bulletin No. 146, published July 1959 by Dow Chemical Company. The epoxy system is composed of liquid epoxide resin which can be cross-linked by a liquid hardener into a thermoset, tough, resistant solid having excellent dimensional stability and strength. Dow Epoxy Hardener (D.E.H.) No. 61 is a clear water-thin material of the amine-type for curing D.E.R. No. 741-A by a non-reversible chemical reaction. The reacted resin system forms a stable, firmly adhesive bond to glass. Other liquid epoxy resins such as modified casting resins, i.e., Dow Epoxy Resin Nos. 331, 332 or 334, which are convertible into thermosetting solids by suitable hardeners or curing agents can also be employed. An example of polyester resin is Plaskon Polyester Resin No. 9407 which is a rigid type, promoter-containing resin to which it is only necessary to add a catalyst such as methyl ethyl ketone peroxide to initiate tack-free cure. This particular resin system is designed for use with glass fibers and glass fiber cloth and is manufactured by Allied Chemical Corporation. Other organic or inorganic bonding agents can be similarly employed to coat the major external surfaces of the funnel member and face plate skirt.

After the funnel is fully coated and while the bonding material remains in a heat-softened thermoplastic condition, a piece of glass fiber cloth 21 having a central opening 21a is dropped over the tube neck portion. A second opening 21b is provided in an intermediate area of glass fiber element 21 for its alignment with the masked anode button 16. The piece of glass fiber cloth or other high-tensile strength material is pulled downwardly into approximately final position, and another equivalent portion of synthetic resin is sprayed over the glass cloth to impregnate and fill openings between individual strands of the glass cloth.

Upon removal of the tube from the spray chamber the resin-impregnated glass cloth element 21 is pulled downwardly and outwardly to smoothly conform the same to the normally-convex exterior surfaces of the funnel and face plate skirt. The lower extremity of glass fiber cloth 21 is pulled down and pressed tightly against the glass surfaces at a central region 12c of face plate flange 12b, i.e., the region of the so-called mold match line. The anode button and neck masks are removed from the tube. The tube is then moved into and passed through a heating chamber such as an infrared radiation heating oven in which the synthetic resin is thermally cured at a temperature ranging from about 200° to 220° F. for a period of approximately 20 minutes.

After curing the thermosetting synthetic resin to chemically bond the glass fiber sheet to the funnel and face plate flange areas, the tube is placed on a turntable and the lower periphery of the glass fiber cloth is trimmed in an annular pattern normal to the tube axis. Glass cloth member 21 is severed at an area adjacent or about one-quarter inch above the mold match line 12c and covers the exterior area of seal line 15.

If desired, a preformed or molded sheet of high-tensile strength material may be substituted for the glass fiber cloth to eliminate the edge trimming operation and to provide better contouring of the funnel covering to the funnel and face plate flange exterior surfaces.

Prior to affixing a peripheral rim band 22 to the envelope, the exterior surfaces of face plate flange portion 12b are coated with an application of synthetic resinous material such as the epoxy resin described hereinabove. Peripheral rim band 22 is contoured to have internal surfaces which are closely complemental to the geometry of the forward external surfaces of face plate flange 12b and the junctive external corner surfaces where viewing area 12a and flange portion 12b intersect. Rim band 22 is preferably comprised of a pair of symmetrical half-sections 22a and 22b each of which is applicable to peripherally surrounding one-half of the face plate skirt and corner areas. The pair of similar split bands is adapted to overlapping at opposing sides of the face plate. An endless band or a band having one peripheral opening can also be employed as desired. The inside surface of band 22 is coated with the bonding adhesive such as an epoxy resin and the band is then positioned on the tube. The epoxy resin coated rim band 22 is placed in a suitable fixture with its larger opening facing upwardly. The tube is then placed inside the rim band. The rim band has a width relative to face place flange 12b suitable to extend peripherally and longitudinally with respect to the tube axis to the region of mold match line 12c and into close proximity with the terminating edge of glass cloth element 21. Termination of the respective edges of rim band 22 and glass cloth covering 21 is variable over the exterior surface of face plate flange 12b and for certain conditions such adjacent termination is preferably located equidistant between mold match line 12c and seal line 15.

Rim band 22 in one embodiment is formed of pressed sheet metal with its two symmetrical sections 22a and 22b capable of fully surrounding and encompassing the prescribed areas as shown in FIGS. 1 and 2. Due to the concavo-convex character of rectangular viewing area 12a of face plate 12 utilized with many conventional types of cathode-ray picture tubes, rim band 22 has a substantially greater width at the center of its arcuately-shaped long axis sides and essentially uniform width on its short axis sides. The terminating edge 22c of rim band 22 resides in a plane parallel and adjacent to mold match line 12c of the face plate flange.

A tension band 23 consisting of high tensile strength material such as annealed steel strapping is then placed around the tube envelope. A connecting clip 24 is fitted onto one end of tension band 23. Annular band member 23 is mounted in position to overlap both an annular portion of rim band 22 including its terminating edge 22c and the adjacent edge portion of funnel covering 21. The rim band is overlapped to approximately one-half the width of the tension band. Tension band 23 consists of a flexible strap of substantially uniform rectangular cross-section. A tensioning device such as an air wrench is employed to draw annular band 23 into tension over a range from about 100 to 2000 pounds or more depending upon the particular size and configuration of the tube envelope. The ends of the band 23 are passed through connecting clip 24 which is then crimped to form a permanent connection of the band ends. If necessary, the ends of the bands are severed at any portion that extends exteriorly of the connecting device.

Figures 5, 7:
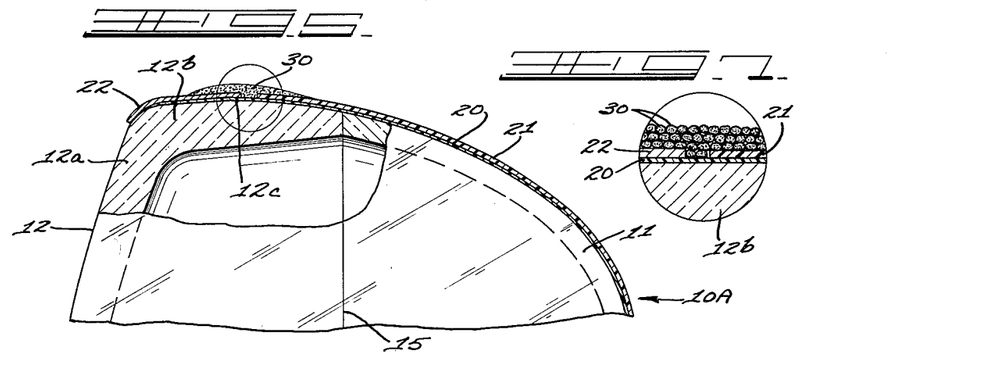
FIG. 5 is an elevational view partly in section of a portion of a cathode-ray picture tube illustrating a modification of the invention.
FIG. 7 is an enlarged fragmentary view of one portion of FIG. 5.

The tube is then inverted with its viewing area facing upwardly for cleaning the optical area in the event that any bonding medium may have inadvertently been applied thereto either during spraying or any other of the aforementioned operations. Where an epoxy resin similar to that described for funnel coating is utilized intermediate the rim band 22 and face plate flange 12b, a final curing treatment of this resin is required. Alternatively, silicones, organic resins or alkali silicate solutions requiring no subsequent curing operation are utilizable intermediate the rim band and the face plate flange. Thus, as shown in FIGS. 2 and 5, cemented rim band 22 is mounted entirely forwardly of seal line 15 to conform snugly to the forward exterior surfaces of flange 12b and the non-viewing curved corner surfaces joining the flange and viewing area 12a. Further, the exteriorly-disposed second annular band 23 where applied is preferably disposed entirely forwardly of the seal line area as shown.

Since rim band 22 is a two-piece or multipiece element, it is obvious how this member can be urged into conforming relation with respect to the surrounded exterior surfaces of the envelope in a plane normal to its axis. Tension band 23 aids in the conformance of the thin-walled rim band to the complementally contoured envelope exterior surfaces throughout their peripheral extent. The application of a constricting force to the multipart rim band serves to minimize the cross-sectional thickness of the intermediate adhesive material required to bond this member to the glass surfaces. The rim band as shown and described hereinabove preferably consists of two U-shaped similar half-sections of thin-walled, flexible, high-tensile strength metal although this element may also consist of a multipiece assembly capable of snugly surrounding the envelope in telescoping relation. The reinforcing band or bands must have sufficient yield strength to prevent fracture propagation into and through the glass sidewalls therebeneath upon breakage of the envelope caused by any means.

With regard to tensioning effects the permanent continuous tension introduced into annular band 23 is a significant factor in obtaining desired controlled devacuation of a television picture tube envelope. It has been found that creating a tensive force in the band of approximately 1500 to 2000 pounds produces satisfactory results in a 23 diagonal inch wide-angle rectangular picture tube envelope having a beam deflection angle of 110° or 114°. Such tension level imparts a considerable safety factor to the tube.

Tests have been conducted on a series of bulbs which were banded with various air pressure levels being applied to a standard air-pressure-operated wrench. Band tensions of 1200, 900, 600 and 300 pounds were introduced into similar external bands on 23 inch rectangular tubes processed in a like manner. All of the tubes were impacted at the three o'clock position on the right-hand side of the tube face plate with an impact of five (5) foot-pounds. In each case the face plate members only cracked or punctured upon impact with no violent devacuations being recorded. On decreasing the band tension, progressively severe degrees of face cracking were observed. Thus, as the band tensions were reduced, greater severity and extent of breakage were observed. In tests where 1500 pound tension is maintained in the external band, less severe cracking and breakage of the face plate was recorded indicating that the tension level in this particular element imparts a marked safety factor to the tube envelope.

Both completed picture tubes and envelopes fabricated in accordance with the invention have been devacuated by various tests including those most frequently employed by the Underwriter's Laboratories. These methods include standard tests face impacts with a 1¼ pound steel ball striking at various impact levels, the thermal shock method and the guillotine method.

Face plate impact tests of the subject tubes with a 1¼ pound steel sphere at 5 to 10 foot-pound levels has resulted in punctures or apertures of varying diameter being formed in the face plate. Usually all fragments produced are drawn inwardly by the negative pressure existent within the envelope upon inrushing of atmospheric air and slight shale or lightweight fragments are at most deposited downwardly immediately in front of the viewing area. The funnel member may crack but normally remains intact without fragmentation.

In the hot rod method a ¼ inch glass rod is heated at its end until this portion is molten. A diamond point is used to form an inscribed cross at the edge of the optical area of the face plate at the twelve o'clock position. The molten end of the glass rod is applied to the center of the inscribed cross by physical contact. If devacuation does not occur within a few seconds as by cracks radiating along the inscribed lines, the rod is removed and cold water is applied to the area to obtain a further thermal shock. Two or three radial cracks depending upon the stress pattern of the glass normally result in the face plate as the evacuated envelope is let down to atmospheric pressure.

In the guillotine test a one-quarter inch diameter steel pin is mounted immediately behind the seal line of the tube which is mounted in a horizontal plane. The pin is disposed with its axis in a vertical plane. Travel of the pin is limited to about ⅛ to ¼ inch. The pin is then impacted with the force of fifty (50) foot-pounds. With the tube fabricated in accordance with the present invention a circular hole is cleanly punched into the funnel through the funnel coating and sidewall while the face normally develops a limited number of small random cracks with no substantial damage.

In the case of both completed tubes and envelopes devacuated by any of the above-mentioned methods while mounted in viewing relation, no more than about an ounce of glass fragments is deposited adjacent and immediately below the viewing area of a tube face plate.

Tubes fabricated in accordance with the above-detailed method possess significant weight advantages and their installation in a wide range of receiver types can be achieved more economically than with various known tube protection systems. Appreciable cost reduction in both the receiver and certain bonded tubes is attainable. Redesigning of the tube envelope per se to lightweight the bulb sidewalls, for example, is entirely within the purview of the present invention. The weight-to-length and weight-to-viewing area ratios provided by the present invetion offer marked improvements in television and other electronic image-producing fields.

It has been found that the subject tubes capable of controlled devacuation can be subjected to nominal impact damage, the results of which may or may not be objectionable depending upon its severity. This damage sometimes results in the formation of small so-called checks in the glass surface which are only perceptible upon close examination of a tube face plate and imperceptible at normal viewing distances. Obviously, when cracks or fissures are formed in the implosion panel or viewing area of the tubes, they then become optically objectionable and rendered unusable.

The subject tube construction provides a single viewing surface to be maintained clean, this surface being readily exposed in such manner as to facilitate easy cleaning. Only one light-reflecting surface is presented in the optical area which may be exteriorly coated or uncoated as desired to reduce reflectivity. Where a rim band is employed to surround the vewing area, it may serve as a bezel to mask the non-viewing periphery of the tube face as well as to function in its devacuation controlling capacity. The subject tube utilizes a safe-guarded envelope which following evacuation may be handled and processed with fewer precautions than required with conventional commercial tubes.

A modified form of the present invention is illustrated in FIG. 5. In this embodiment tube 10A has extensive exterior surfaces of the funnel forward from the yoke area to the annular region of face plate flange 12b coated with a substantially continuous layer 20 of synthetic resin such as epoxy resin or polyester resin and a layer of glass fiber cloth 21 is adhered thereto. An annular rim band 22 such as that shown in FIGS. 1–3, is applied to the peripheral corner and forward region of face plate flange 12b. The adjacent edges of band 22 and glass cloth member 21 are surrounded and encompassed by a plurality of windings of glass fiber roving 30. Each strand of roving consists of about 40–60 individual glass fiber filaments which are grouped together to form a single heavier strand or rope. A layer of synthetic organic resin is applied to adjacent exterior surfaces of rim band 22 and glass cloth 21 and the roving is wound therearound.

In fabricating certain sizes of rectangular tubes ten to twenty turns of roving with each strand being cemented to adjacent like strands by means of the synthetic resin provides substantial reinforcement of this area. FIG. 7 shows an enlargement of the roving 30 wound over and around the adjacent edges of rim band 22 and glass cloth 21. The interstices between the multiple strands of roving 30 are filled with solidified resinous material. Shrinkage of the resinous material on curing serves to exert circumferential restraint on the envelope sidewalls therebeneath and adjacent thereto. The roving is preferably wound in tension although, depending upon the size and shape of the envelope and the number of turns of roving employed, the roving may or may not be wound in tension as desired. As stated, the roving is wound in such manner as to surround and mechanically engage adjacent juxtaposed annular areas of both the rim band and glass cloth members to interconnect these elements into a unitary structure. Other types of filaments such as lengthy wires or other types of high-temperature resistant filaments are utilizable to comprise the endless reinforcing element. The bonding agent employed in conjunction with the glass fiber roving is comprised of epoxy resin such as Dow Epoxy Resin 741. Other resins capable of setting into harder final form are also utilizable.

Figure 6:
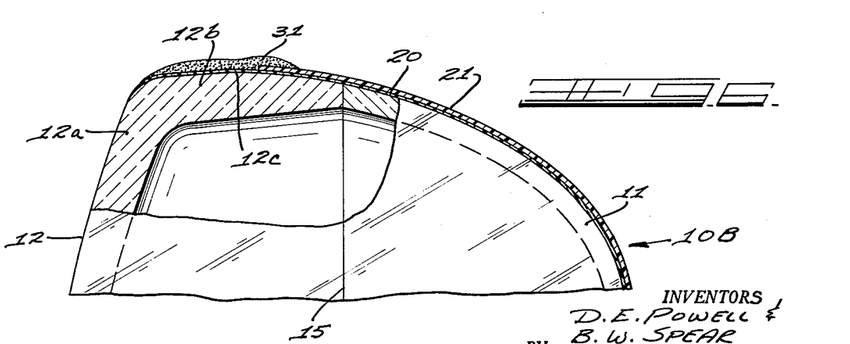
FIG. 6 is a view similar to FIG. 5 illustrating another modification of the invention.

In another form of the present invention, as shown in FIG. 6, the tube 10B has a funnel coating which consists of a layer of resinous bonding medium 20 with an integrally bonded layer of glass fiber cloth 21 adhered thereto as described hereinabove. In this case both the rim band 22 and tension band 23 are eliminated and a heavier layer of resinous material is continued over face plate flange 12b and its corner portion which interconnects with face plate viewing area 12a. Glass fiber roving 31 is wound circumferentially around the area where the several annular bands comprised of rigid material are normally applied. The roving extends over and adjacent the corner region of the face plate commensurate with satisfactory winding thereof. The repeated turns of the roving are extended lengthwise to engage and encircle a terminating region of glass fiber cloth 21 as well as a substantial portion of face flange 12b. A sufficient number of turns of glass fiber roving to impart substantial reinforcement to the area of maximum cross-sectional dimensions of the tube envelope is required. The roving serves to replace the two rigid metallic bands set forth above as elements of the embodiment shown in FIGS. 1–3 inclusive. The resinous material in solidified form is useful for maintaining the glass fibers in finally-disposed permanent arrangement to provide both mechanical reinforcement and positive physical restraint to the face plate flange area. Shrinkage of the resin and/or tensive force in the roving strands introduce compressive stresses in the glass surface and sidewall portions therebeneath.

Figure 8:
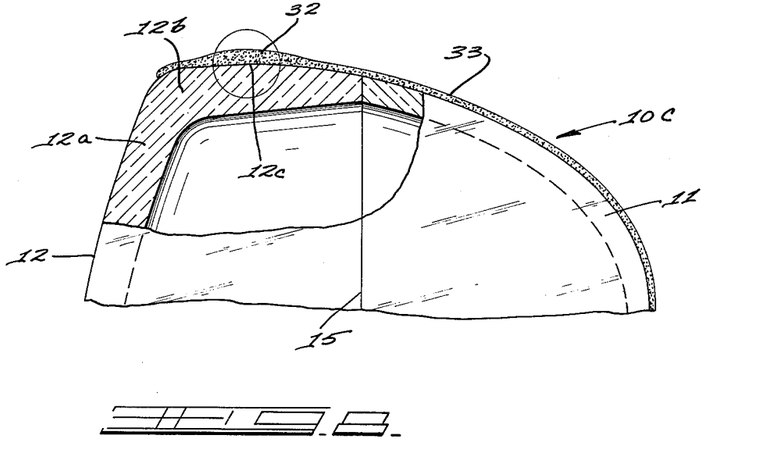
FIG. 8 is a view similar to FIGS. 4 and 5 illustrating still another modification of the invention.

Another modification of the present invention is shown in FIG. 8 wherein the exterior non-viewing surface areas of the funnel and face plate flange portions of tube 10C are coated over their exterior surfaces with a suitable glass bonding medium such as a film or a layer of epoxy resin. Strands of individual glass fibers or glass fiber roving are wound around the tube envelope between its larger and smaller ends in a continuous enclosing pattern. The fibers which are wound around the funnel and the face skirt replace both the glass fiber cloth element 21 and the metallic bands. The fibers or strands of high-tensile strength material can be wound in planes normal to the tube axis or randomly over the non-viewing external surfaces.

Figure 9:
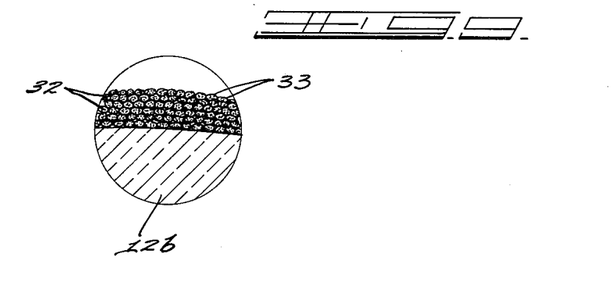
FIG. 9 is an enlarged fragmentary view of one portion of FIG. 8.

The face plate skirt 12b adjacent its viewing area is surrounded by a greater number of turns of the glass fibers to strengthen this prescribed area and provide substantial reinforcement thereof. Glass fiber elements 32 are imbedded within a coating of synthetic resin 33 which is applied immediately precedent, during or subsequent to the winding of the fibers or roving as required. The fibers are indicated in FIGS. 8 and 9 as being built up to a greater depth in the area of the face plate mold match line 12c for appreciably reinforcing this area adjacent the face periphery.

The basic theory involved in fabricating tube envelopes in the subject manner as to be able to control their devacuation on sudden or accidental release of vacuum is not fully understood. On cavitation of the face plate member from any fracture source, its fragments, however large or small, are driven forcefully in a rearward direction by atmospheric pressure to strike and impinge upon internal surfaces of the coated funnel member. Such fragments, whether large or small, may or may not cause breakage of the funnel member from internal forceful impingement. The peripheral flange or side panel of the face plate is maintained essentially intact by the surrounding annular bands or restraining coatings. The funnel being exteriorly coated with an extensive thermally-adherent rupture-resistant material is maintained in integral form, although cracks or fissures may be created therein by the internal blows registered by the face fragments. The coating or protective material which extends over the funnel exterior prevents its collapse on fracture so that air cannot rush into the interior void in a generally forward direction to cause further fragmentation of both the funnel and face plate. Virtually all non-viewing surfaces are protected against damage due to scratches, abrasions, mechanical or thermal shock by the covering materials thereover. Where breakage originates in the funnel, the fragments of this member are restrained by its external covering. In every case, air is prevented from rushing into the vacuumized interior from the funnel area with such force as to cause violent devacuation of the envelope. In most cases, as stated, fracture of the face plate usually results in fragments being drawn inwardly and virtually their complete containment within the envelope proper as the envelope interior pressure rises to atmospheric.

Various modifications may be resorted to within the spirit and scope of the appended claims.

We claim:

1. A direct-viewing television picture tube resistant to fracture and rapid devacuation without implosive-explosive effects comprising a substantially frusto-pyramidal shaped hollow glass envelope having a body member and a face plate member, said body member having flaring outwardly-convex sidewalls extending between its larger and smaller ends, said face plate member having a light-transmitting viewing screen portion surrounded by an annular skirt portion, said skirt portion being joined to the larger end of said body member at a seal line normal to the envelope axis, a first annular band disposed exteriorly and surrounding major surface areas of said face plate skirt portion including the junction surfaces of said skirt and viewing screen portions, a continuous annular layer of rupture-resistant material adhered to extensive non-viewing exterior surfaces of said body member extending substantially integrally between its smaller end and the face plate skirt portion, a second annular band disposed adjacent and surrounding the face plate skirt portion, said second annular band encompassing adjacently-disposed annular regions of both said first band and said layer of rupture-resistant material, and means for maintaining said second band under continuous tension thereby producing increased compression in exterior surface portions of the envelope sidewalls underlying and closely adjacent said second band.

2. A direct-viewing television picture tube in accordance with claim 1, wherein said continuous annular layer of rupture-resistant material on the envelope body member comprises a coating of epoxy resin containing material with an integral sheet of glass fiber cloth bonded thereto.

3. A direct-viewing television picture tube in accordance with claim 1, wherein said continuous annular layer of rupture-resistant material on the envelope body member comprises a coating of polyester resin containing material with an integral sheet of glass fiber cloth bonded thereto.

4. A direct-viewing television picture tube in accordance with claim 1, wherein said continuous annular layer of rupture-resistant material on the envelope body member comprises a high-tensile strength coating of silicon containing material and glass fibers.

5. A direct-viewing television picture tube in accordance with claim 1, wherein said first annular band surrounding the skirt portion of said face plate member comprises a contoured metallic element having a contour substantially complemental to the periphery of the face plate viewing screen portion and the interconnecting exterior surfaces of the face plate skirt portion.

6. A direct-viewing television picture tube in accordance with claim 1 wherein said second annular band comprises a metallic strap of substantially uniform cross-section dimensions and said means for maintaining said second band under continuous tension comprises a clip member adapted to restrain the ends of said second band in positive engagement.

7. The method of fabricating a direct-viewing television picture tube envelope resistant to fracture and implosive-explosive effects on rapid devacuation, said method comprising the steps of applying a rupture-resistant continuous annular coating over the hollow glass body portion of the tube envelope extending substantially over its major non-viewing exterior surfaces, disposing a first annular band over an area of essentially maximum cross-sectional dimensions of said envelope surrounding the periphery of the tube viewing surface, disposing a second annular band around said envelope encompassing adjacent annular areas of both said annular coating and said first annular band, and placing said second annular band in continuous tension to produce increased compression in exterior surface portions of the envelope sidewalls underlying and closely adjacent said second band.

8. The method of making a direct-viewing television picture tube resistant to fracture and implosive-explosive effects on rapid devacuation, said tube being comprised of an essentially all-glass hollow envelope having a frusto-conical shaped body portion and a light-transmitting face plate portion enclosing the larger end of said body portion, said method comprising the steps of applying a firmly adherent rupture-resistant non-metallic coating over the major external surfaces of said body portion extending substantially between its larger and smaller ends, disposing at least one annular metallic band around said envelope forwardly of said body portion encompassing the periphery of said face plate portion and an annular frontal area of said rupture-resistant coating disposed thereat, and applying external mechanical force to said annular band to place the same in continuous tension thereby producing increased compression in exterior surface portions of the envelope sidewalls underlying and adjacent said band.

9. The method in accordance with claim 8 wherein the band has ends including the steps of maintaining said annular band in continuous tension by retention means device connecting the ends of said tensioned band.

10. The method in accordance with claim 8 including the steps of applying said rupture-resistant coating by spraying an organic resin containing film over the major external surfaces of said tube body portion, placing a sheet of glass fiber cloth thereover, and drawing said sheet into firm engagement with the coated tube body portion.

11. The method in accordance with claim 8, wherein said annular band is placed in continuous tension of at least 100 pounds.

12. The method in accordance with claim 8, including the step of mounting an annular face plate retention band around the peripheral flange of said face plate portion and over a terminating area of said rupture-resistant coating and subsequently mounting an annular tension band around said envelope encompassing adjacent areas of said retention band and said rupture-resistant coating.

13. The method of making a direct-viewing television picture tube resistant to fracture and rapid devacuation without implosive-explosive effects, said tube being comprised of an essentially all-glass hollow envelope having a frusto-pyramidal shaped body portion and a light-transmitting generally rectangular face plate portion, said method comprising the steps of firmly adhering a rupture-resistant continuous coating containing glass fibers over extensive external surfaces of said envelope body portion extending substantially between its larger and smaller ends, disposing a first metallic annular band around said envelope surrounding the periphery of said face plate portion, said first annular band having a contour complemental to the exterior surfaces of the periphery of said face plate portion, disposing a second metallic annular band around said envelope encompassing portions of both said first annular band and said rupture-resistant coating, and placing said second metallic annular band in continuous controlled tension to thereby produce increased compression in exterior surface portions of the envelope sidewalls underlying and adjacent said second band.

14. The method of providing fracture restraint and elimination of implosive-explosive effects on fracture of a hollow sealed evacuated glass electron tube envelope, said method comprising the steps of adhering a rupture-resistant substantially continuous coating having high-tensile strength over extensive exterior surfaces of the body portion of the tube envelope, mounting a primary annular retention band on said tube envelope surrounding and firmly retaining the periphery of the envelope viewing portion, mounting a secondary annular tension band on said tube envelope surrounding and engaging adjacent areas of said primary retention band and said rupture-resistant coating, and placing said secondary band in permanent tension to generate at least one circumferential zone of substantially increased compression in exterior surface portions of said envelope at least underlying and adjacent said secondary band.

15. A cathode-ray tube envelope resistant to fracture and capable of controlled devacuation on breakage comprising a substantially funnel-shaped hollow body portion and a light-transmitting viewing portion enclosing its larged end, said viewing portion having an integral peripheral sidewall region of substantially maximum cross-sectional dimensions of said envelope sealed to the larger end of said body portion, a multipiece untensioned reinforcing band of thin-walled, high-tensile strength metal surrounding the peripheral sidewall region and complementally contoured to conform snugly thereto, adhesive means bonding said band directly to the exterior peripheral sidewall region of said envelope, said reinforcing band and intermediate adhesive means having sufficient yield strength to prevent fracture propagation through the envelope sidewall region therebeneath upon breakage of said envelope.

16. A cathode-ray tube envelope resistant to fracture and capable of controlled devacuation on breakage comprising a substantially funnel-shaped hollow body portion and a light-transmitting viewing portion enclosing its larger end, said viewing portion having an integral peripheral sidewall region of substantially maximum cross-sectional dimensions of said envelope sealed to the larger end of said body portion, a multipiece untensioned reinforcing band of thin-walled, high-tensile strength metal surrounding the peripheral sidewall region and complementally shaped to conform snugly thereto, said band being disposed entirely forwardly of the seal area whereat said body and viewing portions are joined, adhesive means bonding said band directly to the exterior peripheral sidewall region of said envelope, means for urging said reinforcing band into intimate conforming relation with respect to said peripheral sidewall region, said reinforcing band, adhesive means and means for urging said reinforcing band into conforming relation conjunctively having sufficient yield strength to prevent fracture propagation through the envelope sidewall region therebeneath upon breakage of said envelope.

17. An essentially all-glass cathode-ray tube envelope resistant to fracture and capable of controlled devacuation on breakage comprising a substantially funnel-shaped hollow body portion and a light-transmitting viewing portion enclosing its larger end, said viewing portion having an integral peripheral sidewall region of substantially maximum cross-sectional dimensions of said envelope sealed to the larger end of said body portion, one untensioned reinforcing band of thin-walled, high-tensile strength metal surrounding the peripheral sidewall region of said viewing portion and complementally contoured to conform snugly to said peripheral sidewall region and the corner surfaces joining said sidewall region and said viewing portion, said untensioned band being peripherally discontinuous but having the ends of each discontinuity lying in close proximity so that the reinforcing effect of said band on the envelope surfaces therebeneath is peripherally continuous, adhesive means circumferentially bonding said untensioned band to the abutting envelope surfaces therebeneath, and a tension band circumferentially enveloping at least one annular portion of said untensioned reinforcing band to apply substantial compressive stress to at least some localized areas of the enveloped annular portion of said reinforcing band to maintain all portions of said reinforcing band in intimate bonded relationship with all envelope surfaces surrounded thereby.

18. An essentially all-glass cathode-ray tube envelope resistant to fracture and capable of controlled devacuation on breakage comprising a substantially funnel-shaped hollow body portion and a light-transmitting viewing portion enclosing its larger end, said viewing portion having an integral peripheral sidewall region of substantially maximum cross-sectional dimensions of said envelope sealed to the larger end of said body portion, one untensioned reinforcing band comprised of a plurality of thin-walled, high-tensile strength metallic sections completely surrounding the peripheral sidewall region and complementally contoured to conform snugly thereto, said band being disposed entirely forwardly of the seal area whereat said body and viewing portions are joined, an intermediate layer of adhesive bonding material disposed peripherally between said band and the exterior surfaces of said peripheral sidewall region therebeneath, an annular layer of rupture-resistant high-tensile strength material adhered to extensive non-viewing exterior surfaces of said body portion extending forwardly to adjacent said untensioned reinforcing band, and constricting means surrounding at least one annular portion of said reinforcing band to maintain the same in closely conforming relation with respect to the surrounding glass surfaces, said reinforcing band, intermediate adhesive layer and constricting means conjunctively having sufficient yield strength to maintain the envelope sidewall region therebeneath substantially intact upon breakage of said envelope.

19. An essentially all-glass cathode-ray tube envelope in accordance with claim 18, wherein said constricting means comprises a second reinforcing band of thin-walled, high-tensile strength metal being maintained in continuous tension and disposed substantially forwardly of said seal area.

20. An essentially all-glass cathode-ray tube envelope in accordance with claim 18, wherein said annular layer of rupture-resistant high-tensile strength material adhered to said body portion comprises a coating of epoxy resin containing material with an integral interwoven sheet of glass fiber cloth bonded thereto.

21. An essentially all-glass cathode-ray tube envelope in accordance with claim 18, wherein said intermediate layer of adhesive bonding material comprises epoxy resin containing material in solidified reacted condition.

22. An essentially all-glass cathode-ray tube envelope in accordance with claim 18, wherein said constricting means comprises a metallic strap having a substantially uniform rectangular cross-section and a clip member positively engaging the ends of said metallic strap to maintain the same in continuous tension.

23. A direct-viewing television picture tube envelope resistant to fracture and capable of controlled devacuation on breakage comprising a substantially frusto-pyramidal shaped hollow body portion and a light-transmitting generally rectangular viewing portion enclosing its larger end, said viewing portion having an integral peripheral sidewall region of substantially maximum cross-sectional dimensions of said envelope sealed to the complemental larger end of said body portion, one untensioned reinforcing band consisting of two U-shaped half-sections of thin-walled, high-tensile strength metal disposed in telescoping relation surrounding the peripheral sidewall region of said envelope and having a complemental contour to conform snugly thereto, said band being disposed entirely forwardly of the seal area whereat said body and viewing portions are joined, adhesive means bonding said band directly to the exterior peripheral sidewall region of said envelope, means for continuously urging said reinforcing band into intimate conforming relation with respect to said sidewall region, said reinforcing band, adhesive means and means for continuously urging said reinforcing band into conforming relation conjunctively having sufficient yield strength to prevent fracture propagation through the envelope sidewall region therebeneath upon breakage of said envelope.

References Cited by the Examiner

UNITED STATES PATENTS

| | | | |
|---|---|---|---|
| 2,052,286 | 8/1936 | DuBois | 156—99 |
| 2,063,350 | 12/1936 | Shoemaker | 156—99 |
| 2,785,820 | 3/1957 | Vincent et al. | 220—2.1 |
| 2,828,235 | 3/1958 | Holland et al. | 161—186 |
| 2,879,323 | 3/1959 | Nichols et al. | 161—186 |
| 2,963,612 | 5/1959 | Thorington | 313—116 |
| 2,966,997 | 1/1961 | Stutske | 220—2.1 |
| 3,166,211 | 1/1965 | Stel et al. | 220—2.1 |

FOREIGN PATENTS

| | | |
|---|---|---|
| 22,398 | 4/1935 | Great Britain. |

THERON E. CONDON, *Primary Examiner.*

EARLE J. DRUMMOND, *Examiner.*

J. M. CASKIE, M. L. RICE, *Assistant Examiners.*